United States Patent [19]

Notoya et al.

[11] Patent Number: 4,917,972
[45] Date of Patent: Apr. 17, 1990

[54] ELECTRODE FOR USE IN OXYGEN ELECTRODE REACTION

[75] Inventors: Reiko Notoya, Sapporo; Tatsumi Nagayama, Yokosuka, both of Japan

[73] Assignee: Alps Electric Co., Ltd., Tokyo, Japan

[21] Appl. No.: 204,434

[22] Filed: Jun. 9, 1988

[30] Foreign Application Priority Data

Oct. 2, 1987 [JP] Japan .............................. 62-249170

[51] Int. Cl.$^4$ ............................................ H01M 4/90
[52] U.S. Cl. ......................................... 429/44; 429/40
[58] Field of Search .................. 429/40, 44; 252/182.1

[56] References Cited

U.S. PATENT DOCUMENTS

| | | | |
|---|---|---|---|
| 3,288,653 | 11/1966 | Holt et al. | 429/44 |
| 4,127,468 | 11/1978 | Alfenaar et al. | 429/44 X |
| 4,210,501 | 7/1980 | Dempsey et al. | 204/129 |
| 4,224,121 | 9/1980 | Dempsey et al. | 204/98 |

Primary Examiner—Anthony Skapars
Attorney, Agent, or Firm—Guy W. Shoup; Paul J. Winters; Stephen L. Malaska

[57] ABSTRACT

An electrode for use in oxygen electrode reaction wherein an electrode activation material layer made of $IrO_2$ is disposed to the surface of an electrode substrate made of platinum or platinum graphite. Since the oxygen equilibrium potential approximate to the theoretical value can be obtained stably the electromotive force of the cell can be increased and a great current can be taken out.

3 Claims, 1 Drawing Sheet

ELECTRODE FOR USE IN OXYGEN ELECTRODE REACTION

BACKGROUND OF THE INVENTION

1. Field of the Invention

The present invention concerns an electrode for use in oxygen electrode reaction which is suitable as a cathode in a fuel cell such as an oxygen-hydrogen cell.

2. Description of the Prior Art

In an oxygen-hydrogen electric cell, porous hollow electrodes each made of graphite, platinum or nickel are inserted into an electrolyte solution and hydrogen is charged to one electrode (positive electrode) and oxygen charged to the other electrode (negative electrode), in which utilized the electric current due to the following reactions when both of the electrodes are connected by conductors:

Positive electrode reaction: $H_2 \rightarrow 2H^+ + 2e$

Negative electrode reaction: $O_2 + 4H^+ + 4e \rightarrow H_2O$

In this case, when viewed as an electric cell, the electrode from which electrons flow out (positive electrode in the reaction above) constitutes a cathode, while the electrode into the electrons flow constitutes an anode (negative electrode in the reaction above).

The electromotive force in an oxygen-hydrogen cell is determined as an oxygen equilibrium potential. The oxygen equilibrium potential is defined as a value obtained by subtracting the standard hydrogen electrode potential at the anode from the potential under the equilibrium state at the cathode and the value theoretically determined from a thermodynamical point of view is 1.23 V vs NHE.

However, cathode materials capable of stably obtaining the oxygen equilibrium potential approximate to the theoretical value have not yet been obtained at present. For instance, no equilibrium potential can be obtained by a $Pt/PtO_2$ electrode, and the static potential, at the most noble state, 1.15 V, io=$10^{-9}$ A/cm$^2$. In a $Ru_2O_3$ or $PbO_2$ carbon electrode, the static potential is: $\leq 0.9V$, io=$10^{-6}$ A/cm$^2$ and it is stable only for several days.

It is considered that the reason why the oxygen equilibrium potential approximate to the theoretical value can not be obtained stably is due to the fact that dissociation and adsorption of oxygen is inhibited at the electrode surface when oxygen is intaken to the electrode at the cathode and that complicate reactions proceed at the surface of the electrode to change the potential.

SUMMARY OF THE INVENTION

Object of the Invention

The object of the present invention is to provide an electrode for use in oxygen electrode reaction capable of stably attaining an oxygen equilibrium potential approximate to the theoretical value.

Based on the fundamental knowledge that Ir is most excellent in the molecule adsorption performance, $IrO_2$ is extremely stable against the structure change and the composition change due to reaction and $Ir^{4+}$ has a strong electron acceptablility, the present inventors have found that a high reactive and stable oxygen equilibrium potential can be obtained by disposing an electrode activation material layer composed of $IrO_2$ to the surface of an electrode substrate made of platinum or platinum graphite and have accomplished the present invention.

That is, the feature of the electrode for use in oxygen electrode reaction according to the present invention lies in disposing an electro activation material layer composed of $IrO_2$ onto the surface of an electrode substrate made of platinum or platinum graphite.

In this way, in the present invention, since the electrode activation material layer made of $IrO_2$ is disposed, $O_2$ molecules are liable to be intaken at the electrode surface and oxygen equilibrium potential as per the theoretical value can be obtained. Furthermore, since platinum or platinum graphite having high oxygen absorbing performance and high chemical reaction stability is used as the electrode substrate, the potential can be obtained stably.

As the material for the electrode substrate in the present invention, platinum or platinum graphite is used and the electrode substrate may be any of rod-like, meshlike and plate-like shapes. The electrode activation material layer made of $IrO_2$ can be formed to the surface of the electrode substrate by means of various methods and a method of obtaining $IrO_2$ by electrodeposition to the surface of the electrode substrate, or a method of coating a slurry containing $IrO_2$ dispersed therein to the surface of the electrode substrate and then applying heating and drying is preferably employed.

The electrode for use in oxygen electrode reaction according to the present invention is suitable, for example, as the cathode of fuel cells including oxygen-hydrogen cells and since an oxygen equilibrium potential approximate to the theoretical value can be realized stably as described above, it is possible to increase the electromotive force of these cells. Furthermore, since the electrode is extremely stable, a large current can be taken out.

BRIEF DESCRIPTION OF THE ACCOMPANYING DRAWINGS

These and other objects, as well as advantageous features of the present invention will be apparent by reading the following detailed descriptions for preferred embodiment of the invention in conjunction with the accompanying drawing, in which FIG. 1 is a graph showing the cathode polarization curve of the electrode obtained by the embodiment of the present invention in an 0.1N $H_3BO_3$ solution.

DESCRIPTION OF THE PREFERRED EMBODIMENTS

Example 1

Figure 1:
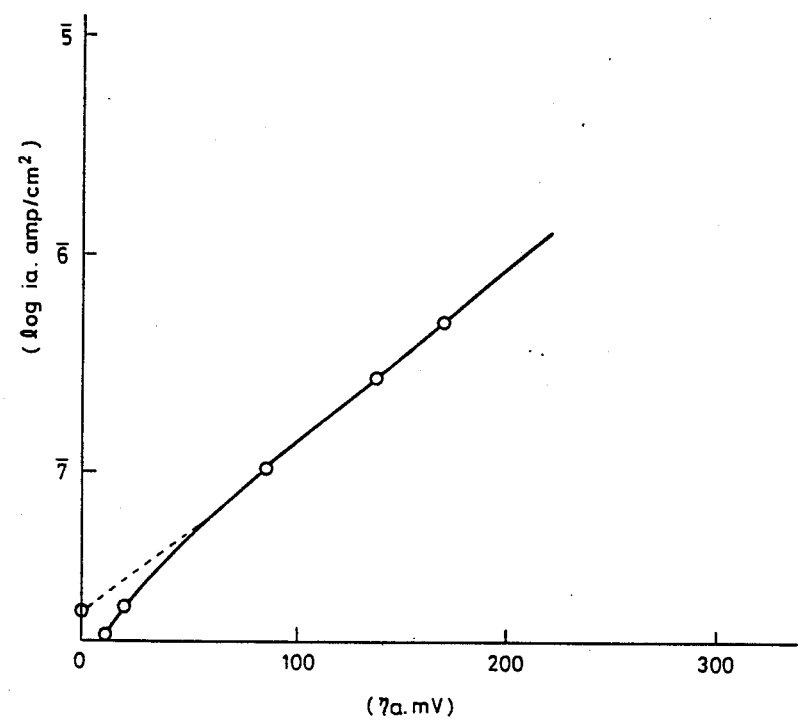

A platinum gage was immersed in an acidic 2 wt % HCl solution of $Na_2IrCl_6$, and Ir was electrodeposited to the surface thereof thereby forming an electrode. The portion electrodeposited with Ir turned blue black to show the presence of $IrO_2$.

The electrode was immersed into two kinds of solutions, that is, an aqueous 0.1N solution of $H_3BO_3$ and an aqueous 0.01N solution of $H_2SO_4$ and the static potential was measured respectively under the oxygen atmosphere of 1 atm.

As a result, a constant potential was attained from ten to several tens minutes after immersing the electrode into the solution and introducing oxygen. Then, Et vs RHE= 1220 mV in an aqueous 0.1N $H_3BO_3$ solution and Et vs RHE=1170 mV in an aqueous 0.01N $N_2SO_4$ solution. The potential was invariable for several tens day.

EXAMPLE 2

Platinum foils were immersed in an aqueous solution in which $IrO_2$ was dispersed, to deposit $IrO_2$ at the surface thereof, which was heated and dried to form electrodes.

The electrodes were immersed in an aqueous 0.1N solution of $H_3BO_3$ and static potential in an oxygen atmosphere under 1 atm was measured.

As a result, Et vs RHE=1230 mV was reached sooner than that in the electrode of Example 1. The potential was not changed for 10 months and even after the change of the potential by the cathode polarization or change of the gas phase with air, it was confirmed that the changed potential returned to the initial value described above.

The electrode was immersed in an aqueous 0.1N solution of $H_3BO_3$ and the polarization curve under the normal state using constant current was determined. The results are as shown in FIG. 1 and the slope was 155 mV, $io = 3 \times 10^{-8}$ amp/cm$^2$. The electrode surface area is the apparent area of the platinum foil.

The foregoing result is sufficiently comparable with $io = 10^{-9}$ amp/cm$^2$ of the platinum electrode with the highest activity obtained so far and it has an activity higher by about two digits as compared with that of the Ir electrode or Pt-Ir alloy electrode.

As has been described above according to the present invention, since the electrode activation material layer made of $IrO_2$ is disposed to the surface of the electrode substrate made of platinum or platinum graphite, oxygen equilibrium potential just along with the theoretical value can be obtained stably. The electrode is suitable as the cathode for fuel cells including, for example, oxygen-hydrogen cell and, since the oxygen equilibrium voltage can be obtained stably as per the theoretical value, it is possible to increase the electromotive force of the cell and obtaining a large current.

What is claimed is:

1. An electrode for use in oxygen electrode reaction wherein an electrode activation material layer made of $IrO_2$ is disposed to the surface of an electrode substrate made of platinum or platinum graphite.

2. An electrode for use in oxygen electrode reaction as defined in claim 1, wherein the electrode activation material layer made of $IrO_2$ is formed by electrodeposition.

3. An electrode for use in oxygen electrode reaction as defined in claim 1, wherein the electrode activation material layer made of $IrO_2$ is formed by coating, heating and drying an $IrO_2$-containing slurry.

* * * * *